E. E. McINTYRE.
INTERCHANGEABLE HUB FOR MOTOR VEHICLES.
APPLICATION FILED AUG. 9, 1919.
1,375,223.
Patented Apr. 19, 1921.
2 SHEETS—SHEET 1.
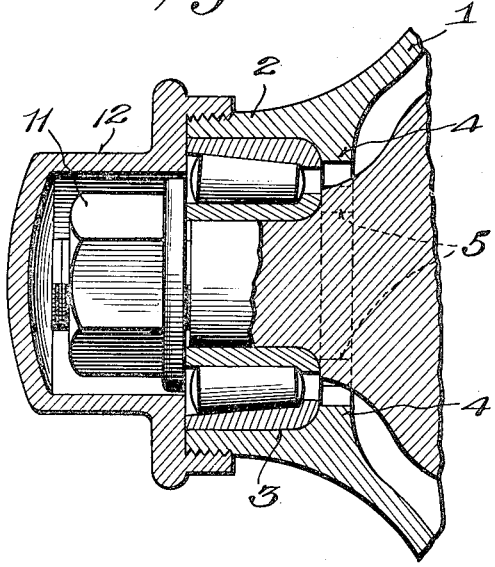
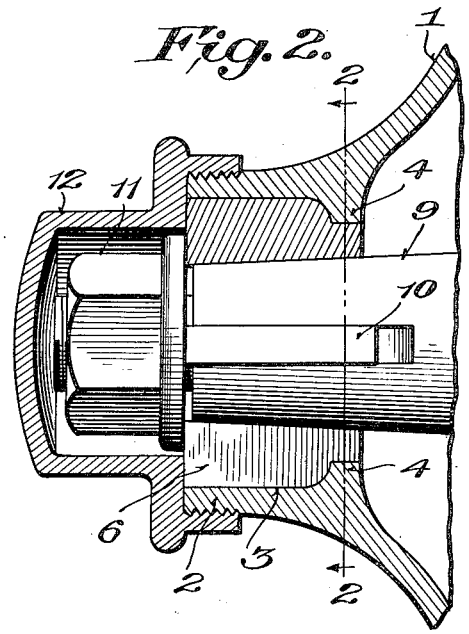
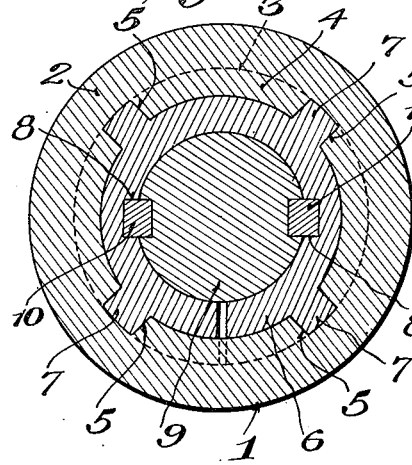
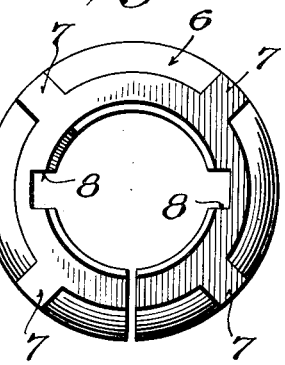
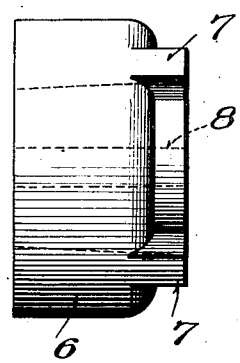
Witness
Chas. L. Griesbauer
Inventor
Elmer E. McIntyre
By F. T. Johnson
Attorney E. E. McINTYRE.
INTERCHANGEABLE HUB FOR MOTOR VEHICLES.
APPLICATION FILED AUG. 9, 1919.
1,375,223.
Patented Apr. 19, 1921.
2 SHEETS—SHEET 2.
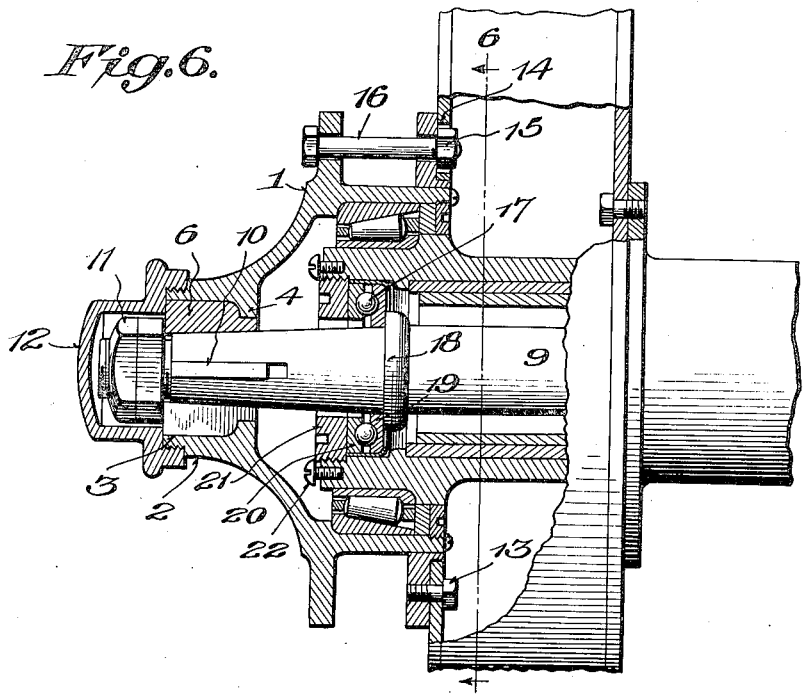
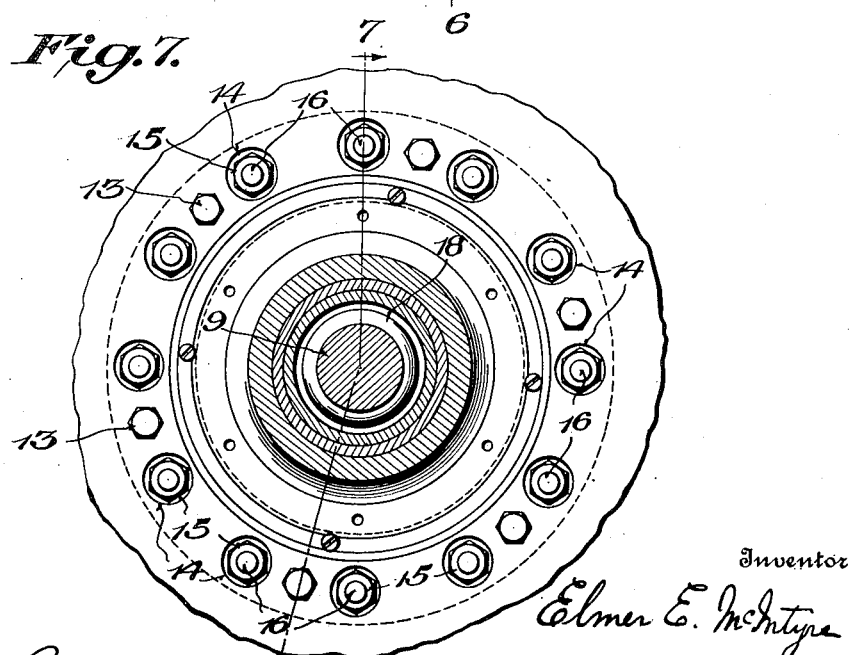

UNITED STATES PATENT OFFICE.

ELMER E. McINTYRE, OF PITTSBURGH, PENNSYLVANIA.

INTERCHANGEABLE HUB FOR MOTOR-VEHICLES.

1,375,223.     Specification of Letters Patent.      Patented Apr. 19, 1921.

Application filed August 9, 1919. Serial No. 316,410.

*To all whom it may concern:*

Be it known that I, ELMER E. McINTYRE, a citizen of the United States, residing at Pittsburgh, in the county of Allegheny and State of Pennsylvania, have invented certain new and useful Improvements in Interchangeable Hubs for Motor-Vehicles, of which the following is a specification, reference being had therein to the accompanying drawing.

This invention relates to improvements in wheel hubs for use on automobiles and other motor vehicles, and has particular reference to a hub that may be interchangeably used upon front and rear axles of such vehicles. The general construction of the hub portion of both front and rear automobile wheels is practically the same with the exception of the reduced or outer end thereof. The outer end of a hub designed for use on a front axle is provided with a suitable chamber for the reception of some form of anti-friction bearing adapted to be seated on the spindle, while a hub designed for use on the rear axle is provided in its outer or reduced end with an axle-box having channels or key-ways therein for the reception of splines or keys on the outer end portions of the driving shaft, and by reason of this difference in structure it is now impracticable to use such wheels interchangeably. However, I have devised a means whereby this desirable end may be readily and quickly accomplished, thereby avoiding the expense incident to the equipping of a machine with more than a single extra wheel. To this end the invention consists in the construction, arrangement and novel combination of the parts of the device hereinafter described, illustrated in the drawing, and more particularly pointed out in the claims hereunto appended.

In the drawing:

Figure 1 is a longitudinal vertical central sectional view of a hub, such as is designed for use on the front axles of motor vehicles, provided in its outer or reduced end with a chamber for the reception of an anti-friction bearing adapted to be seated on the spindle of the front axle. Fig. 2 is a similar view to that shown in Fig. 1, showing the anti-friction bearings replaced by my improved resilient split bushing designed to adapt the hub for use on the rear axle. Fig. 3 is a sectional view taken on line 2—2 of Fig. 2, showing the relative positions of the assembled parts. Fig. 4 is an end view of my improved removable resilient split bushing. Fig. 5 is a side elevation of said split bushing. Fig. 6 is a longitudinal section of the hub and a portion of the rear axle and adjacent parts taken on line 7—7 of Fig. 7, showing the assembled parts, and the manner of securing the brake-drum to the wheel hub. Fig. 7 is a view taken on line 6—6 of Fig. 6, also showing the manner of attaching the brake-drum to the wheel hub.

Referring to the drawing, the numeral 1 indicates a hub designed for use on the front axle of motor vehicles, and 2 the outer or reduced end thereof. The reduced end 2 is provided with a chamber 3, in which, when used upon the front axle, sits an anti-friction bearing, and is provided in its inner wall 4 with a plurality, preferably four, of channels or key-ways 5, as shown in Fig. 3. The numeral 6 indicates my improved resilient split bushing provided with suitable lugs or keys 7 located, preferably, at one end thereof, and adapted, when the said bushing is placed into the said chamber 3, to register and fit into channels or key-ways 5 in the wall of said chamber 3, whereby the said bushing will be rigidly secured to said hub, as is evident. The bore or axle box of the split bushing 6 is provided with, preferably, two oppositely disposed channels or key-ways 8, as shown, for a purpose to be stated. The numeral 9 indicates the usual driving shaft of the rear axle having its outer end portion provided with suitable splines or keys 10, adapted to register with and fit into the channels or key-ways 8 of the bushing 6, whereby power is transmitted through said shaft to the wheel. The numeral 11 indicates the usual spindle nut, and 12 the hub-cap.

In the event of an accident to either a front or rear wheel of a vehicle, the damaged wheel may be removed, and if a front wheel, the extra wheel slipped immediately upon the front axle, and secured thereon; if, however, damage is done to a rear wheel, the split bushing 6 is inserted into the chamber 3 in the hub of the extra wheel and the damaged rear wheel removed, when said extra wheel may be set in position on the rear axle, and secured thereon in the usual manner, as is evident.

If the wall in the chamber 3 in the outer or reduced end of the hub is not provided, in the first instance, with the channels or key-ways 5, such channels may, at small expense, be easily placed therein, and the wheel put in condition to receive a split bushing having lugs or keys at one end thereof, as is apparent. The split bushing 6, owing to a certain amount of inherent resiliency will, under ordinary conditions, fit into the chamber 3 sufficiently tight to make the connection between it and the hub casing rigid, and, therefore, this bushing may be made without the lugs or keys 7, but in order to insure the rigidity of the bushing with the hub I prefer some more positive means, and therefore use the keys 7 and the channels 5 as one of the simplest ways of accomplishing this end.

In Figs. 6 and 7 I have shown a means for attaching the brake-drum directly to one of these interchangeable wheel hubs. As is well known there are two characters of wheels, one provided with wire spokes, and the other with wooden spokes. In the case of a hub having wire spokes, the wall of the drum may be positioned directly against the hub and attached to the flange on such hub by means of the bolts 13, as is evident. When a wheel having wooden spokes is used, in order that the brake-drum may be set directly against the hub, the wall of the drum lying next the hub must be provided with suitable apertures 14 to receive the nuts 15 on the ends of the bolts 16 that hold the wooden spokes to the hub, such drum being secured to the hub by bolts 13, as is evident.

In Fig. 6 I have also shown an improved bearing for the driving shaft 9, this bearing being located in the plane of the spokes of the hub. This bearing 17 not only provides a support for the shaft 9, but also by reason of its contact with the flange 18 on the shaft 9 holds said shaft against displacement and in engagement with the driving mechanism, as will be obvious. This bearing comprises the race rings 19 and 20 and the balls interposed therebetween, and is held in position by the ring nut 21, which in turn is held securely against displacement by the locking screws 22, as is evident.

Having described my invention what I claim is:

1. As a new article of manufacture, an auxiliary bushing provided with key-ways or channels in the axle-box thereof, and having lugs or keys integral therewith at one of its annular ends, said bushing being designed for emergency use on the driving shaft of the rear axle of a motor vehicle of the standard construction, and adapted to replace the anti-friction bearings in the outer or reduced portion of a hub of a standard wheel designed for use on the front axle of a motor vehicle, and to be removably secured on the said driving shaft of the said rear axle, to provide for the substitution of such front wheel for the usual standard rear wheel upon the rear axle of the standard construction.

2. As a new article of manufacture, an auxiliary resilient split bushing provided with key-ways or channels in the axle-box thereof, and having lugs or keys integral therewith at one of its annular ends, said bushing being designed for emergency use on the driving shaft of the rear axle of a motor vehicle of the standard construction, and adapted to replace the anti-friction bearings in the outer or reduced portion of a hub of a standard wheel designed for use on the front axle of a motor vehicle, and to be removably secured on the said driving shaft of the said rear axle, to provide for the substitution of said front wheel, in case of an accident, for the usual standard rear wheel upon the rear axle of a motor vehicle of the standard construction.

3. In combination with the hub of a standard wheel designed for use on the front axle of a motor vehicle, an auxiliary bushing, designed for emergency use on the driving shaft of the rear axle of a motor vehicle of the standard construction, and adapted to replace the anti-friction bearings in the outer or reduced portion of said hub and to be removably secured upon the driving shaft of said rear axle, to provide for the substitution of such standard front wheel, in case of an accident, for the usual standard rear wheel upon the rear axle of a motor vehicle of the standard construction.

4. In combination with the hub of a standard wheel designed for use on the front axle of a motor vehicle, an auxiliary resilient split bushing, designed for emergency use on the driving shaft of the rear axle, and adapted to replace the anti-friction bearings in the outer or reduced end of said hub, and provided with lugs or keys at one end thereof and integral therewith, and key-ways or channels in the axle box thereof, and to be removably secured on the said driving shaft of the rear axle of a motor vehicle of the standard construction, whereby such front wheel may be substituted for the usual standard rear wheel upon a rear axle of the standard construction.

In testimony whereof I hereunto affix my signature in the presence of a witness.

ELMER E. McINTYRE.

Witness:
F. T. F. JOHNSON.